Nov. 6, 1923.
V. E. GERZÉN
SCREW
Filed Sept. 28, 1922
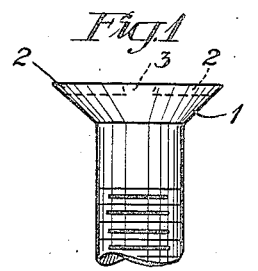
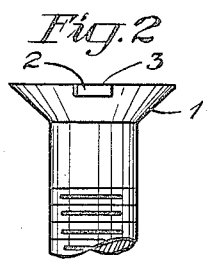
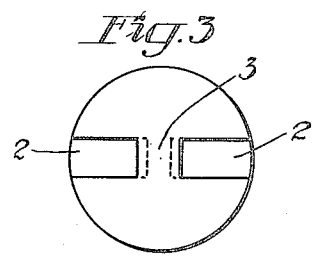
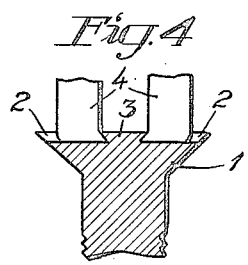
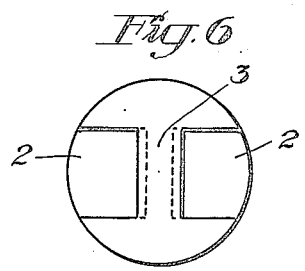
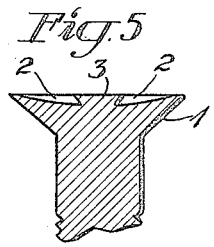
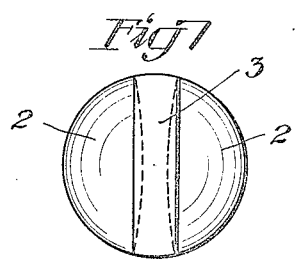
Inventor
V. E. Gerzén Patented Nov. 6, 1923.

1,473,033

UNITED STATES PATENT OFFICE.

VIKTOR EMANUEL GERZÉN, OF SVANOBRUK, SWEDEN.

SCREW.

Application filed September 28, 1922. Serial No. 591,149.

*To all whom it may concern:*

Be it known that I, VIKTOR EMANUEL GERZÉN, a subject of the King of Sweden, residing at Svanobruk, in the Kingdom of Sweden, have invented certain new and useful Improvements in Screws, of which the following is a specification.

When using screws of that type, which are provided with a transversal slot in the head or the end, there are often some inconveniences. Thus, for instance, it is impossible, when screwing in the screw, to hold and guide the screw in a reliable manner by means of a screw-driver only. A further drawback consists in the edges of the slot being worn off at the screwing in and unscrewing of the screw, so that the screw-driver finally glides out and the carrying out of the said operations is impossible. Besides, in order to prevent the screw-driver from gliding out a comparatively great pressure axially of the screw generally must be exerted, which, however, not always is possible.

In order to remove the said drawbacks it has been proposed to provide in the head or end of the screw a substantially central part, which is located between two recesses and may be grasped by means of the jaws of a tongs or the like. The present invention relates to screws of the type last mentioned and the object of the same is to so arrange the said central part, that it may be grasped by the tongs and the screw held in a more reliable manner than hitherto.

In the accompanying drawing Figs. 1 and 2 are two different side views of a screw arranged in accordance with this invention. Fig. 3 is a plan view of the screw. Fig. 4 is a longitudinal section of the screw and shows the ends of the jaws of a tongs used for screwing in and unscrewing the screw. Fig. 5 shows in a longitudinal section a screw with a modified shape of the recesses. Figs. 6 and 7 are plan views of screw heads provided with recesses differing from those shown in Fig. 3. Figs. 8 and 9 show details.

In the head 1 of the screw two slots or recesses 2, 2 are provided, between which there is a central part 3. The said part 3 is dove-tailed, as shown. The angles formed by the bottom sides of the recesses 2 and 2 and the sides of the dove-tailed part 3 may, evidently, be varied, as shown in Figs. 8 and 9. In the screw shown in Figs. 1 to 4 inclusive the recesses 2, 2 are rectangular transversally and extend radially inwards from the periphery of the head 1 to the central part 3. The bottom walls of the recesses are substantially perpendicular to the longitudinal axis of the screw. The width of the recesses and thus the length of the central part may, evidently, be varied and is adapted to the shape and the size of the screw, compare Figs. 3 and 6.

In Fig. 4 the jaws 4 of a tongs are indicated. The said jaws are put into the recesses 2 and 2 and brought to engage the part 3. The said jaws are guided laterally by the side walls of the recesses, so that the jaws together serve as a screw-driver at the same time as they engage the central part. Owing to the fact that the central part is dove-tailed the tongs, the jaws of which are correspondingly shaped, as shown in Fig. 4, will hold the screw in a very reliable manner and the guiding of the screw, while it is screwed in, is considerably facilitated.

In the screw shown in Fig. 5 the bottom sides of the recesses 2 and 2 are curve shaped in such manner, that the depth of the recesses is greatest at or in the vicinity of the central part.

The jaws of the tongs must not necessarily be guided laterally by the recesses. As shown in Fig. 7, the recesses 2 and 2 may be so arranged, that the central part 3 extends transversally of the head for the whole (or substantially the whole) width of the same, so that the said head has a transversal dove-tailed projection. The said form of execution of the invention is preferred with respect to the wholesale manufacture of the screws. The bottom walls of the recesses may be plane or semi-cup-shaped, as shown.

I claim:

1. A screw including a head having opposed recesses extending radially inwards from the periphery and leaving a substantially central dove-tailed part between said recesses having its narrow section located at the bottom of the recess.

2. A screw in accordance with claim 1 wherein the recesses are deepest in the vicinity of the dove-tailed part.

3. A screw in accordance with claim 1 wherein the recesses are of such a width that the dove-tailed part extends substantially diametrically across the whole surface of the head.

In testimony whereof I have affixed my signature in presence of two witnesses.

VIKTOR EMANUEL GERZÉN.

Witnesses:
 GEORG EUGEN OLSSON,
 NILS OLOV LÖVGREN.